Dec. 10, 1929.  R. W. A. BREWER  1,738,560
LUBRICATING SYSTEM
Filed Oct. 23, 1926
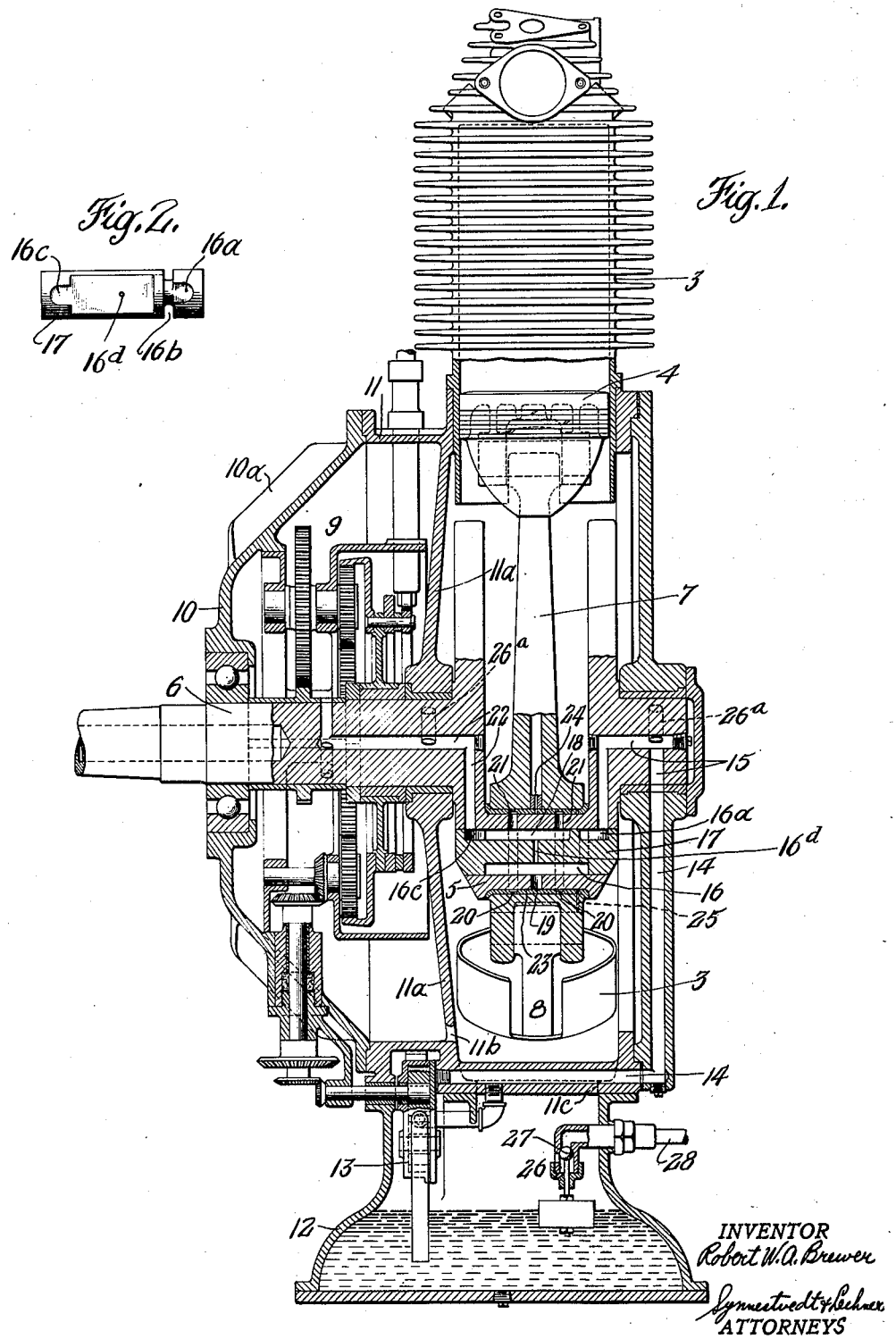

Patented Dec. 10, 1929

1,738,560

UNITED STATES PATENT OFFICE

ROBERT W. A. BREWER, OF JENKINTOWN, PENNSYLVANIA, ASSIGNOR TO HAROLD F. PITCAIRN, OF BRYN ATHYN, PENNSYLVANIA

LUBRICATING SYSTEM

Application filed October 23, 1926. Serial No. 143,546.

This invention relates to lubricating systems, and is particularly useful in association with crank shafts of engines.

One of the primary objects of the invention is to provide improved and effective lubricating means for engines.

Another object of the invention is to provide a lubricating system which also serves to carry off heat from certain of the parts apt to become overheated.

Still another object of the invention is the provision of a system of the character described which is very economical of oil, while, at the same time, adequate and proper lubrication of the various parts is obtained.

A further object of the invention is to provide a plug for crank shaft lubrication of improved and simplified construction.

How the foregoing, together with such other objects as may hereinafter appear, or are incident to my invention, are realized, is illustrated in preferred form in the accompanying drawings, wherein—

Fig. 1 is a vertical cross section through an engine illustrating the application of my improvements thereto, with certain of the parts appearing in elevation; and Fig. 2 is a detailed view of an oil plug which I employ.

Referring now to Fig. 1, it will be seen that I have shown my invention in association with a crank engine of the radial type, which engine, in general, comprises a plurality of cylinders 3, each having a piston 4. Suitable connecting rods are provided for connecting the pistons to the crank pin 5 of the crank shaft 6, and, in the particular arrangement here shown, the rod 7 is a master connecting rod to which the remaining rods 8 are connected. A timing gear device indicated as a whole by the numeral 9 is associated with the engine for operating the valve cams and ignition device, which gear device, in this instance, is mounted on and housed within the cover portion 10 of the engine casing 11.

My improved oiling system comprises, in general, an oil reservoir 12, preferably located at the bottom of the engine casing; an oil pump 13; an oil passage 14 leading through a bridge piece from the pump to the crank shaft; an oil passage 15 in the crank shaft communicating at one end with the passage 14, and at its other end with a chamber 16 in the crank pin 5 provided by the oil plug 17, which plug is preferably a force fit in the crank pin, although any other suitable method of securing it in place may be employed; means for passing oil from said chamber 16 to a second chamber 18 provided by the plug 17, comprising a port or ports 19, grooves 20 and ports 21 registering at one end with the grooves 20, and communicating, at their other ends, with the chamber 18 and a bleed hole 16$^d$ to regulate the pressure on the oil film; and a second passage 22 in the crank shaft leading from the chamber 18 to the periphery of the crank shaft, or, as is the case in the particular embodiment shown, to the periphery of the hub of the timing gear mounted on the crank shaft.

The manner in which the system operates is as follows: Oil is drawn from the reservoir 12 by the pump 13, which may be of any suitable form and driven as by means of gearing connected to the timing gear mechanism 9, and is delivered to the chamber 16 through the medium of the passages 14 and 15 above described. In this connection, it is pointed out that the oil plug is provided with a pocket 16$^a$ arranged to register with the passage 15 in the crankshaft, and an annular groove 16$^b$ serving as a means of communication between the pocket and the chamber 16. From this chamber the oil passes by means of the port 19 to the inner surface of the connecting rod bushing 23, and then forces its way to the grooves 20 which may be located either in the bushing, or on the crank pin. By virtue of these grooves being in registry with the ports 21, the oil then passes to the chamber 18, it having passed around the crank pin to provide proper lubrication of the pin. A second pocket 16$^c$ is provided in the plug 17, which pocket registers with the passage 22 in the crank shaft and serves as a means of communication between the chamber 18 and the passage. In order to regulate the pressure on the oil film and to enable a large flow of oil to pass through the crank pin, a by-pass is provided between the high pressure pocket 16 and the relief pocket 18. This can preferably be a hole 16ᵈ through the partition in the plug, or may be a slot between the pocket 16ᵃ and the pocket 18. By this means a portion of the oil is led to said passage and finally discharges at the periphery of the crank shaft into the casing or timing housing, it being noted that this portion of the casing is separated from the main portion of the casing by a wall 11ᵃ.

Oil, on leaving the shaft, is thrown around or sprayed over the timing gears and associated parts by reason of the rotation of the shaft, thus lubricating them, and, at the same time, oil strikes the relatively cooled inner surface of the cover portion 10, thus cooling the oil for return to the reservoir. I have shown fins 10ᵃ on the cover 10 to aid in cooling the oil.

It is pointed out that in my system more oil is pumped than is required to lubricate the parts, and that only a very little oil works out around the crank pin, the main portion of the oil passing through the crank shaft and carrying off the heat generated at the crank pin, which heat, so to speak, is transferred to the cooled surface of the cover 10. By this means the crank pin is cooled and only a small amount of oil reaches the pistons and cylinder, whereby over-lubrication thereof is prevented.

Bleed passages 24, connecting with the hollow part of the piston rods, are provided for feeding lubircant to the piston pins, and similar passages 25 are provided for feeding lubricant to the pins connecting the piston rods to the master rod. Ports or holes 26ᵃ leading from the crank shaft passages may also be provided to feed lubricant to the main crank shaft bearings.

A port or opening 11ᵇ is provided in the wall 11ᵃ through which the oil in the cover portion of the casing may be returned to the main casing from whence it drains back into the reservoir through the ports or opening 11ᶜ on each side of the bridge piece carrying the passage 14 in the bottom of the main casing 11.

A float actuated valve device is indicated at 26 for maintaining a predetermined level of the oil in the reservoir. In Fig. 1 the reservoir 12 is shown filled with oil to the desired level, and the valve 27 is indicated in its closed position, which closes off the oil feed to the reservoir. As the oil level lowers, the float drops to open the valve and feed more oil to the reservoir. This valve device is connected to a suitably located oil tank by means of the pipe 28.

While I have shown and described my invention in connection with a radial engine, it is to be understood that its advantages may be obtained in connection with other types of engines, as well as in any mechanism where an excessive discharge of oil from the bearing is objectionable, and where it is desirable to carry off heat from the bearings which are apt to become overheated.

I claim:—

1. The combination with a shaft and a member in which the shaft rotates of means for lubricating said shaft and member including a chamber within the shaft, means for dividing said chamber into two chambers, a port for establishing communication between said chambers, means for delivering oil under pressure to one of said chambers, a passage from said chamber to the surface to be lubricated, and an outlet from the other chamber.

2. The combination with a shaft and a member in which the shaft rotates of means for lubricating said shaft and member including a chamber within the shaft, means for dividing said chamber into two chambers, a port for establishing communication between said chambers, means for delivering oil under pressure to one of said chambers, a passage from said chamber to the surface to be lubricated, means for leading oil from the other chamber to a point remote of the surface to be lubricated and an outlet for said means.

3. In an engine, the combination with its crank shaft and piston rod or rods, of means for lubricating the same including a source of oil supply, a plug in the crank pin having a chamber in communication with said source of oil supply and in communication with the surface to be lubricated, another chamber in direct communication with the first chamber, and an outlet from said second mentioned chamber removed from the lubricated surface.

4. In an engine, the combination with its crank shaft and piston rod or rods, of means for lubricating the same including a source of oil supply, a plug in the crank pin, means for passing oil from the plug to the surface to be lubricated, means for by-passing a portion of the oil through the plug, and an outlet from said last mentioned means removed from the lubricated surfaces.

In testimony whereof I have hereunto signed my name.

ROBERT W. A. BREWER.